US005840155A

United States Patent [19]
Rebeaud

[11] Patent Number: 5,840,155
[45] Date of Patent: Nov. 24, 1998

[54] BLOWER ARRANGEMENT FOR DETACHING A METALLIZED BELT FROM A SHEET AND FOR PROVIDING A BRAKING FORCE ON A SHEET IN A PLATEN PRESS

[75] Inventor: Jean-Claude Rebeaud, Le Mont-Sur-Lausanne, Switzerland

[73] Assignee: Bobst SA, Lausanne, Switzerland

[21] Appl. No.: 638,179

[22] Filed: Apr. 26, 1996

[30] Foreign Application Priority Data

Apr. 28, 1995 [CH] Switzerland .......................... 01226/95

[51] Int. Cl.[6] ...................................................... B32B 31/00

[52] U.S. Cl. .......................... 156/584; 156/497; 156/344; 156/240; 156/247; 101/487; 101/424.1; 137/883; 137/878; 251/337

[58] Field of Search .................................... 156/584, 344, 156/240, 247, 580, 583.1, 497; 271/97; 101/487, 424.1; 137/883, 878; 251/337

[56] References Cited

U.S. PATENT DOCUMENTS

| | | | |
|---|---|---|---|
| 2,204,802 | 6/1940 | Gessler | 101/424.1 |
| 2,819,075 | 1/1958 | Noon | 271/97 |
| 2,904,070 | 9/1959 | Lynott | 137/883 |
| 3,770,175 | 11/1973 | Lale-Demoz | 226/110 |
| 4,059,470 | 11/1977 | Primavesi et al. | 156/238 |
| 4,597,573 | 7/1986 | Reba et al. | 271/97 |
| 5,181,709 | 1/1993 | Okada et al. | 271/97 |
| 5,232,024 | 8/1993 | Williams | 137/883 |
| 5,537,925 | 7/1996 | Secor et al. | 101/424.1 |

FOREIGN PATENT DOCUMENTS

| | | |
|---|---|---|
| 516 458 | 1/1972 | Switzerland . |

*Primary Examiner*—David A. Simmons
*Assistant Examiner*—Linda R. Gray
*Attorney, Agent, or Firm*—Hill, Steadman & Simpson

[57] ABSTRACT

A blower arrangement for detachment of a metallized belt from a sheet and for creating a braking force on a sheet, which belt and sheet are situated between platens of a press in a machine for printing sheet elements which comprises a bar arrangement near the exit of the press in which is provided a series of nozzles having the form of flattened parallelpipeds, each of these nozzles being sealed by a translational mobile cylindrical valve member movable perpendicular to an air supply duct with the valve member having a communication passage. The plane of the jets coming from the nozzles is directed approximately horizontally between the metallized belt and the sheet.

5 Claims, 3 Drawing Sheets

FIG. 2
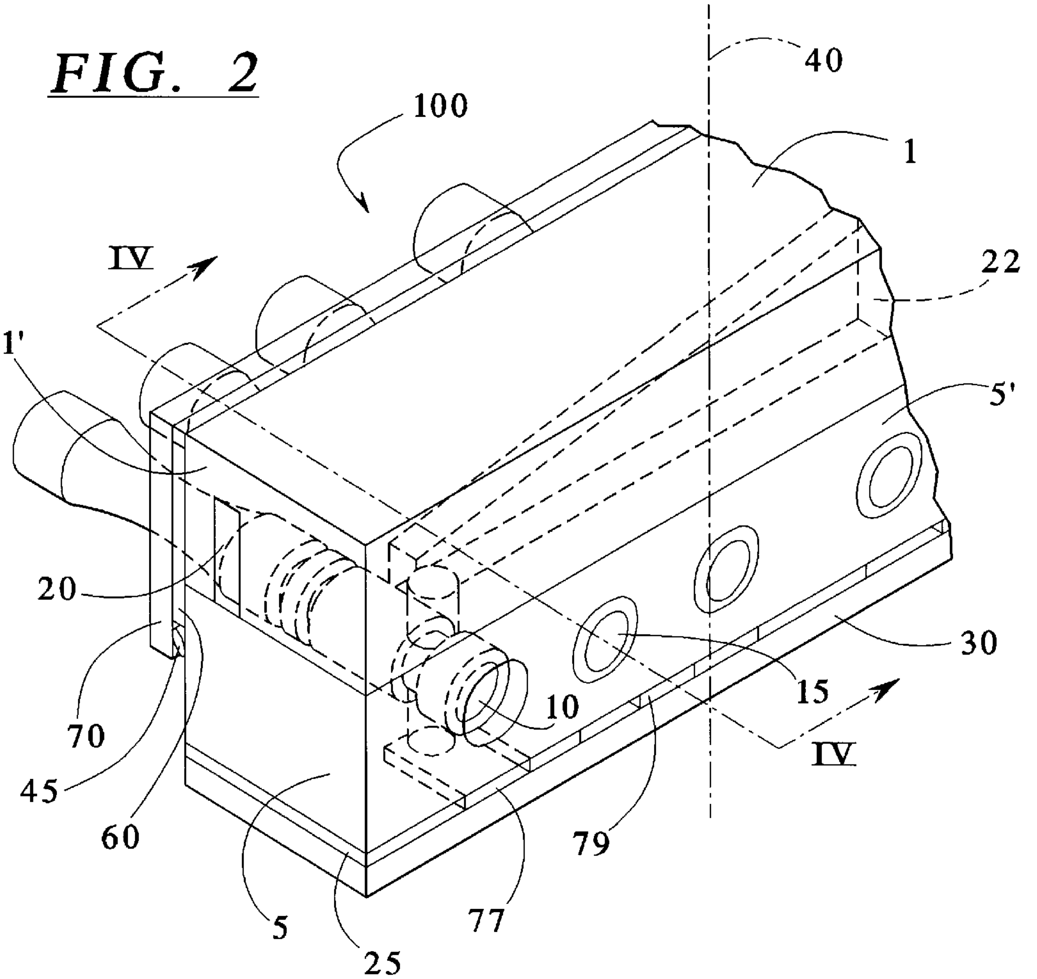
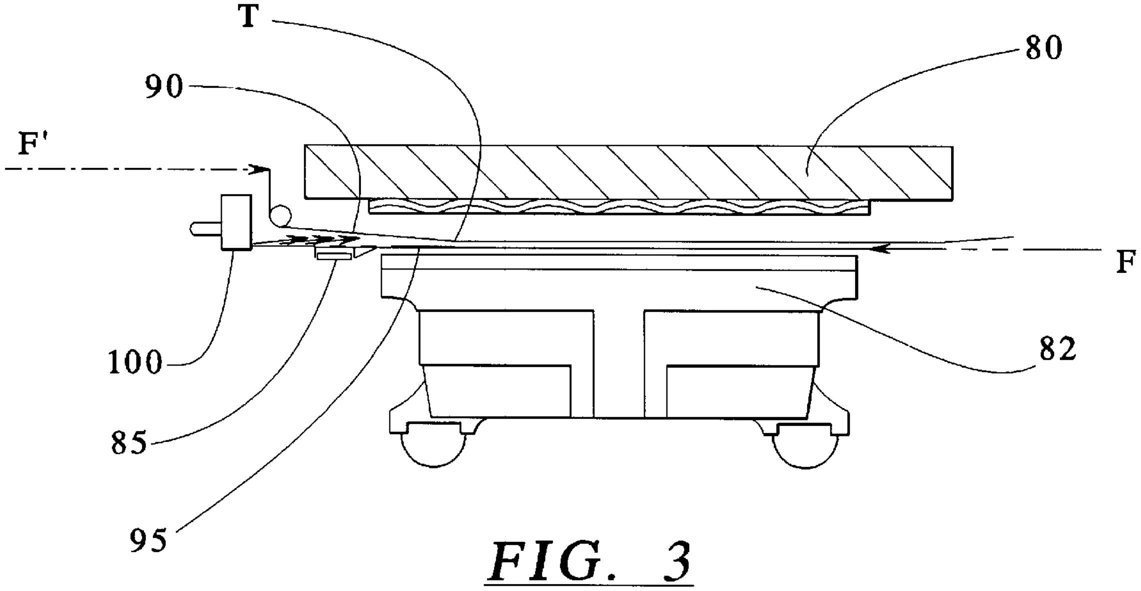
FIG. 3

BLOWER ARRANGEMENT FOR DETACHING A METALLIZED BELT FROM A SHEET AND FOR PROVIDING A BRAKING FORCE ON A SHEET IN A PLATEN PRESS

BACKGROUND OF THE INVENTION

The present invention is directed to a blower arrangement for detaching a metallized belt or band and for creating a braking force on a sheet in a platen press, which comprises an upper fixed supporting beam or platen and a lower mobile supporting beam or platen, between which beams a cardboard sheet is moved in order to receive a printing, according to a given pattern, from a metallized film coming from a belt conducted between the sheet and one of the supporting platens of the press. The arrangement comprises a bar arranged near an exit of the press, which bar is provided with a series of nozzles, each sealed by a control means. More particularly, the invention concerns a platen press between whose platens the sheet is fed for transfer according to a given printing pattern of a metallized film coming from a belt conducted between the sheet and one of the platens.

The platen press of this type usually comprises, first, an input station in which is installed a stack of sheets, each sheet being successively removed from the top of the stack in order to be sent to a layout board. On the board, each sheet is placed in position against a front stop and a lateral stop before being grasped along a front edge of the sheet by a series of clamps or gripper fingers, which are mounted along a transverse bar, whose ends are attached to lateral chain trains which move the bar and, thus, the sheet into the subsequent processing stations of the press. The processing stations may be a cutting station, which is followed by a waste ejection or removal station, and these stations are finally followed by a receiving or delivery station in which each sheet released by the clamps falls squarely onto the top of a stack which is accumulated on an output pallet.

An independent transport arrangement, made up of parallel metallized belts, successively comprises a support for the belt supply bobbins, means for the intermittent unrolling and advancing of the belts, guiding means for guiding these belts around one of the platens of the press, a tension mechanism for placing the belts under tension at least along their path between the platens and an arrangement for the removal of the worn or used belts from the machine, which is usually through a lateral window. The metallized belts having an identical speed of intermittent unwinding pass through the same advancing and unrolling means, while the belts having different speeds pass through second or even third separate advancing means, and the tension mechanism is controlled, in this case, as a function of the higher speed.

More particularly, each metallized belt comprises a support film of the polyester type, on which is fixed a pigment layer by means of a layer of wax. The external surface of the pigment layer is coated with a layer of thermofusible adhesive.

At each cycle of the machine, the sheet and the metallized film or belt are advanced and then immobilized, and the platens of the press are closed. This closing simultaneously grips the sheet and the belt between a plurality of blocks and counterpieces, which are arranged facing one another respectively on each of the platens. Since the block or counterpiece is heated, it causes a melting of the wax and the setting of the thermofusible glue only in the areas of those contact surfaces and, thus, implements a transfer of the pigments from the belt to the sheet according to a given pattern.

When the press is reopened after the printing, the polyester film has a tendency to remain attached to the sheet. In order to force this separation, a jet of pressurized air is directed approximately at a junction of the sheet and polyester film.

Moreover, during a deceleration before becoming immobilized under the press, a rear part of the sheet has a tendency to catch up with the front part that is being fed by the bar with the clamps or gripper fingers. This effect tends to distort perceptibly the flatness of the sheet. The flatness characteristic is of primary importance for high-quality printing. It is thus necessary to ensure that the sheets remain as flat as possible when it is immobilized on the lower supporting platen of the press. For this purpose, a jet of pressurized air is also directed in the plane of the sheet, so as to create a braking force during a deceleration of the sheet and to, therefore, decelerate the movement of the sheet.

Known means for blowing air take the form of a plurality of nozzles distributed along a bar positioned near the downstream part of the platen, or the part toward which the sheet arrives. For reasons of cumbersomeness, the actual bar is situated slightly obliquely, just underneath the last guiding roller directing the metallic belts or bands under the platen. This nozzle is made up of a cylindrical bored passage provided along the width of the bar, which passage is partially closed by the side of the platen. The bored passage contains a check screw, whose threading action in the female threads of the bore permits the point to be advanced and withdrawn in relation to the orifice. In addition, close to the point, the bored passage communicates with a pressurized air conduit. By screwing or unscrewing the check screw, the nozzle in question can be opened or closed and, thus, activated or deactivated.

A major disadvantage of this embodiment is the conical shape given to the air jet by the profile of the check screw. This jet shape is not optimal for the use to which it is put.

In addition, since the bar is positioned so as to maintain a certain accessibility, the oblique orientation of the jet does not correspond to the optimal angle of incidence. In particular, the force of the jet does not extend to the tangential point between the sheet and the metallized belt or band.

Finally, when the printing series is changed, it is necessary to activate only the nozzles corresponding to the new locations of the belts or bands. It is thus necessary to adjust each of the nozzles by means of a screwdriver or other suitable tool, which is tiresome. In addition, the conditions of accessibility of the machine, which is often mediocre or poor, are aggravated by the necessity of using a tool.

SUMMARY OF THE INVENTION

An object of the present invention is to provide a blower arrangement for detaching a metallized belt and for creating a braking force on a sheet upon its arrival in a printing machine, which enables the generation of a flow of air that is more effective, due to its shape and its orientation. In addition, this arrangement must also ensure an effective braking force on the sheet during a deceleration phase.

Preferably, in the arrangement according to the present invention, each nozzle must be easily accessible so that it can be easily maneuvered for the selection of its mode of operation, whether it is open or closed. Moreover, the design of these nozzles must be such that it is no longer necessary to use a tool for opening or closing the nozzle. Finally, the design of the arrangement must remain simple in order to ensure a long reliability and reasonable cost of construction.

These objects are obtained in a blower arrangement comprising a bar arranged near an exit of the press, and the bar is provided with a series of nozzles, each sealed by a control valve or means due to the fact that each nozzle is formed as a flattened parallelpiped, and in which the plane of the jet coming from the nozzle is directed approximately horizontal between the metallized belt or band and the sheet. After numerous shop tests, this geometry of the nozzles and, thus, of the air flow proved to be particularly effective for the implementation of a firm holding of the sheets during their deceleration and for rapid separation of the metallized belts stuck to the sheet by the melted wax.

According to the preferred embodiment, the control means of each nozzle is a valve, which has a valve member that is axially movable perpendicular to a supply duct for the pressurized air, with each valve comprising a communication passage. Preferably, the axial translation motion of each valve member is manually controlled, and each valve member is retained in each of two axial positions, one for an open valve and one for a closed valve, by a flexible biasing means, such as a spring wire being received in one of two indexing recesses provided on the periphery of the valve member. The actuation of any of the nozzles can take place rapidly and completely as soon as the operator has gained access to the valve handle of the valve member.

According to the preferred embodiment, each nozzle is implemented by a stack of a base plate, a diffusion plate having rectangular notches and a distribution bar having, above each notch, an air supply duct that opens out and that can be sealed by a valve member that is axially movable with a perpendicular translation. The pressurized air is thus carried to the ducts of the distribution bar by two distribution grooves provided along a portion of a length of a lower surface of the supply bar stacked on the distribution bar. The embodiment of the arrangement is particularly advantageous in that each bar can be individually fashioned with no particular problem, the stacking being automatically centered by transversing fixing means. In this way, parallelpiped nozzles are easily implemented, which would otherwise be very difficult to bore. Advantageously, the distribution grooves have a decreasing cross section, with their largest cross section being situated at the inlet to the groove to ensure an identical pressure at each nozzle and, thus, a uniformity of the jets along the entire width of the press.

Other advantages and features of the invention will be readily apparent from the following description of the preferred embodiments, the drawings and claims.

BRIEF DESCRIPTION OF THE DRAWINGS

FIG. 2 is an assembled view of the arrangement of FIG. 1;

FIG. 3 is a side view of the installation of a blower arrangement in a press.

DESCRIPTION OF THE PREFERRED EMBODIMENTS

Figure 1:
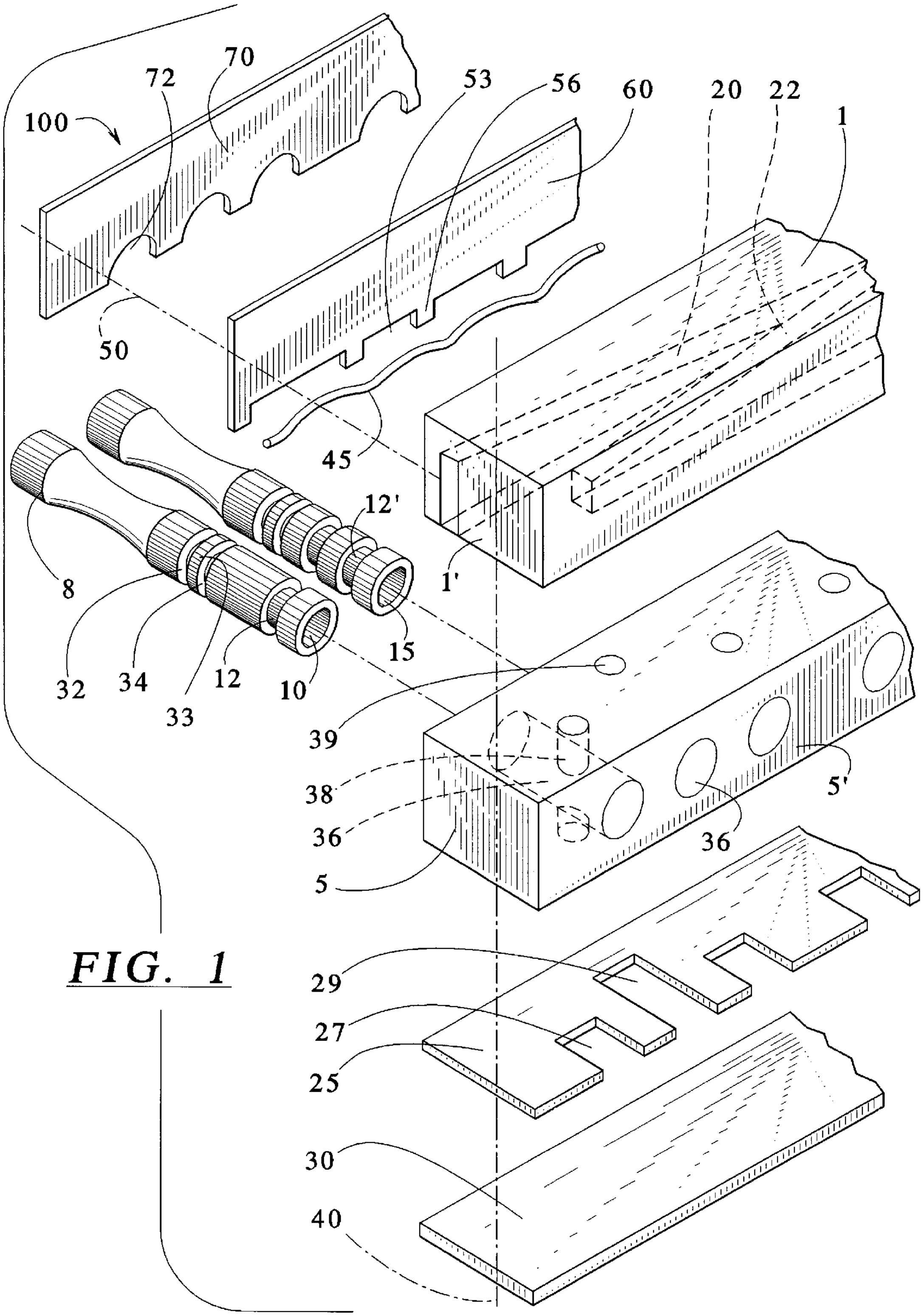
FIG. 1 is an exploded view of the blower arrangement according to the present invention.
Figure 4:
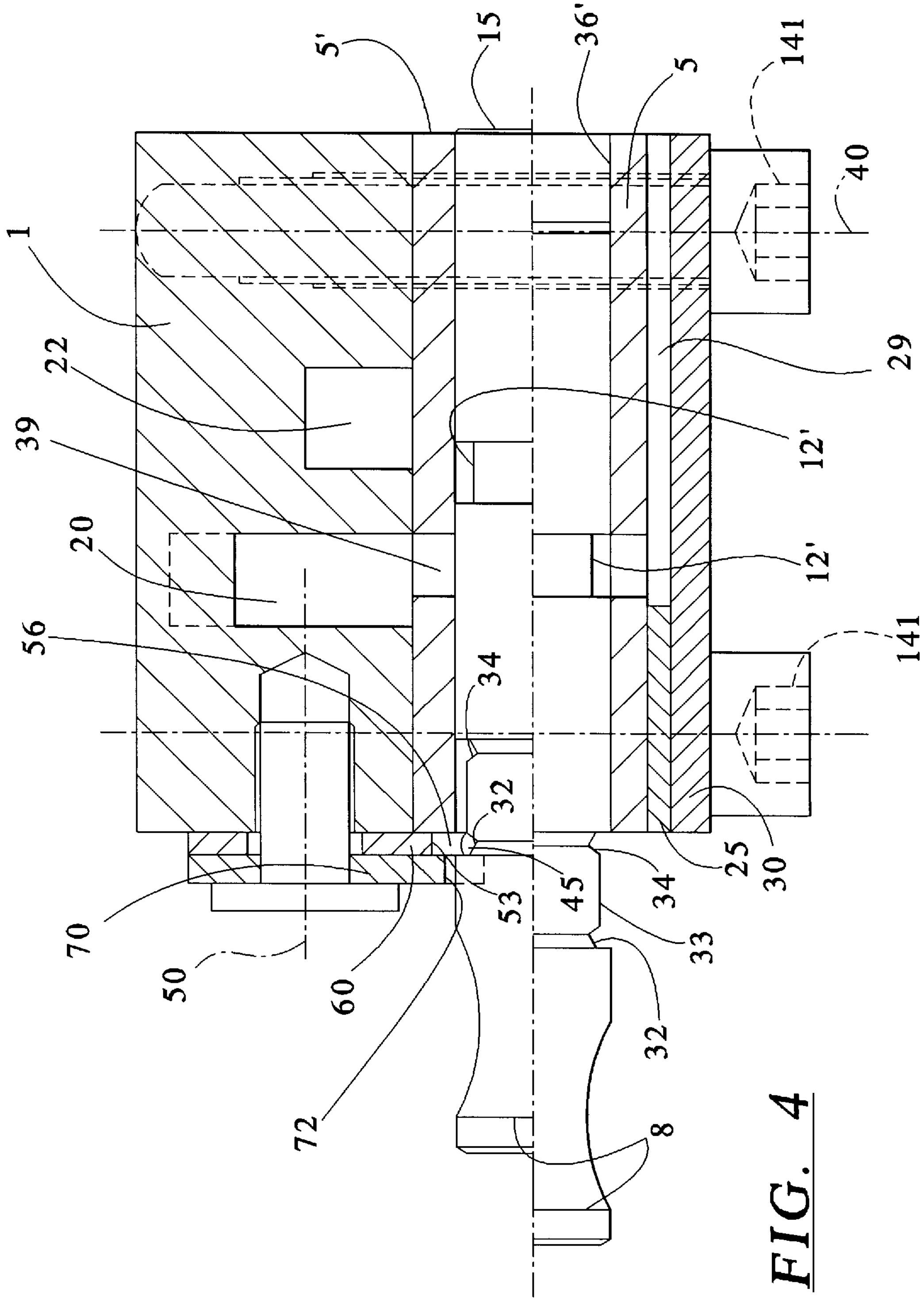
FIG. 4 is a cross sectional view taken on lines IV—IV of FIG. 2 with portions in elevation to show two positions for a valve member.

The principles of the present invention are particularly useful in a blower arrangement, generally indicated at 100 in FIGS. 1 and 2, and includes an upper supply bar or manifold 1, a distribution bar or manifold 5, a diffusion plate 25 and a base plate 30. As shown in FIG. 2 and 4, these four elements are vertically superposed and are held together by fixation means 141 situated along an axis 40.

The supply bar or manifold 1 (FIG. 1) has two grooves 20 and 22 on a lower surface, which extend longitudinally. More precisely, a braking groove 20 is provided along the downstream side of the bar 1 and a separating groove 22 is provided on the upstream side. The groove 20 originates on one of the lateral sides or ends 1', which is illustrated in FIG. 1, while the groove 22 originates on the opposite lateral side or end. Each of these grooves extends a part of the length of the supply bar 1. In addition, the bottom of each of these grooves is inclined so that the cross section of the groove decreases as the groove extends inward from its particular end. These grooves are individually connected to means for supplying a pressurized air, which is not shown and which comprises a controlled solenoid valve, with the air extending into each of them at the large cross sectional end, which is the origin. In addition, a section of the frame of the printing machine is supported on the two lateral ends of the supply bar so as to close the grooves 20 and 22 at their beginning.

A plurality of cylindrical vertical bored passages 38 and a second plurality 39 are formed in two rows on the distribution bar or manifold 5. Each vertical bored passage 38 corresponds to the separating groove 22 and each of the vertical bored passages 39 corresponds to the braking groove 20. As is clearly visible in FIG. 2, the separating groove 22 is implemented to extend longitudinally approximately to the vertical bored passage 38 farthest from the origin of the groove. In the same way, the braking groove 20 is implemented longitudinally to extend approximately to the vertical bored passage 39 farthest from the origin of the groove 20. These vertical bores 38 and 39 are machined regularly in groups of three into the distribution bar or manifold 5. More precisely, each group of three is made up of two bores 38 and a central bore or passage 39.

Each of the vertical bored passages 38 intersects with a circular bore or passage 36 that extends across the width of the distribution bar 5. In a similar manner, each of the vertical passages 39 intersects with a circular passage or bore 36' that also extends across the width of the bar 5. These orifices 36 and 36' are positioned approximately at half-height or mid-height in the bar 5.

A control valve member 10 is installed in a sliding fashion in each of the circular orifices or bores 36 and a control valve member 15 is disposed in each of the orifices or bores 36' (see FIG. 4). Each of these valve members 10 and 15 are provided with an operating handle 8 at one end and have a cylindrical body in which are cut, at the rear, two grooves 32 and 34, separated by a flange 33 and also an annular channel or groove 12 or 12' adjacent the front of the valve member. The distance separating the grooves 32 and 34 is approximately equal to the width of the annular channel 12 or 12'. The width of each of the channels 12 or 12' is, itself, approximately equal to the diameter of the vertical bored passages 38 and 39. It should be noted that the only difference between the valve member 10 and the valve member 15 is the axial position of the grooves 12 and 12', with the groove 12 of the valve member 10 being at an axial distance from the groove 34, which is equal to the distance of the bore 38 from the back side of the bar 5, and the axial distance of the channel 12' of the member 15 from the recess 34 being equal to the distance of the bore 39 from the back side of the bar 5.

The cylindrical annular channels 12 and 12' of the valve members 10 and 15, respectively, are positioned along the axis of the member so that when the end of the valve members 10 and 15 are flush with a front surface 5' of the distribution bar 5, the annular channels or passages 12 and 12' are positioned just in front of the vertical bores 38 and 39, respectively. In this same configuration, the front surface of the recess 32 of each of the valve members 10 and 15 will be flush with the rear surface of the distribution bar 5.

To hold the valve members in their two axial positions, a flexible member, such as a wire spring 45, has a section enabling it to be accepted in each of the recesses 32 and 34. More precisely, this wire spring is mounted above each of the recesses of the valve members (See FIG. 4). A support plate 60 has on its lower surface cutouts 53 separated by projections 56, with the cutouts being centered on each of the valve members. This plate 60 is applied against the upper part of the vertical surface behind the supply bar 1 and the distribution 5, and the projections press on the wire spring 45.

To hold the plate 60 and spring 45 in position, a holding plate 70 has its lower surface provided with a plurality of machined gaps 72 of circular arcs, whose diameter is slightly greater than the external diameter of the valve members 10 and 15. The holding plate 70 is supported longitudinally against the plate 60 with the circular arcs 72 following the cylindrical external surface of each of the valve members 10 and 15, while pressing the wire spring 45 against the corresponding surfaces of the distribution bar 5. The holding plate 70 and support plate 60 are fixedly attached to the rear surface of the supply bar 1 by fixation means or fasteners situated along the axis, such as 50. The relationship of these plates 60, 70 and of the wire spring 45 to each other is clearly shown in FIG. 4.

The diffusion plate 25 has a plurality of transverse notches 27 and 29. Each notch 27 is called a separating notch, and has a depth so that it will be in communication with a vertical bored passage 38. In the same way, each of the notches 29 is a braking notch and has a greater vertical depth so that it will be in communication with the bored passages 39 when the plate 25 is mounted on the bottom surface of the distribution manifold 5. Each bored passage 38 or 39 will open vertically into the base part of the notch 27 or 29, respectively. The base plate 30 held against the lower surface of the diffusion plate 25 determines, together with the lower surface of the distribution bar or manifold 5, separating nozzles 77 having a flattened rectangular cross section of the separating notches and braking nozzles 79 which have the same flattened cross section at the braking notches 29, as clearly shown in FIG. 2.

Referring to FIG. 3, the blower arrangement 100 according to the present invention, is positioned downstream from a platen press horizontally and slightly above the place of passage of a bar 85 with clamps drawing a sheet 95 into the press. More precisely, the nozzles are placed at the same time beneath the metallizing belt 90, which is moving between the support beams 80 and 82 of the press and above the sheet 95 in a direction indicated by the arrow F'. The sheet 95 also is moved by the bar 85 in the direction of the arrow F between the two supporting platens.

As described above, the blower arrangement according to the present invention functions in the following manner.

The pressurized air penetrates into the braking and separating grooves 20 and 22 at their origin where their cross section is large, or at a point where the depth of each of the grooves is greatest. This inclined aspect of each of the grooves enables the maintenance of a relatively constant flow pressure along the entire length of the groove.

The air circulating in the separation groove 22 will penetrate into the vertical bored passage 38 and the separating valve member 10 present in the horizontal circular orifice or bore 36 will either permit or prevent the passage of the air flow. In particular, when the valve member 10 is located with its end flush with the front surface 5' of the bar 5, air cannot enter the nozzles.

With the front of the valve member 10 or 15 flush with the surface 5', the wire spring 45 compressed by the projections 56 of the support plate 60 will be accepted in the recess 32 (See FIG. 4) and ensures that the valve member 10 or 15 is longitudinally held in the closing position. When a manual axial movement toward the rear is exerted on the handle 8 of the valve member, the wire spring 45 is deformed vertically out of the groove 32 and over the flange 33. This vertical displacement of the wire spring is possible due to the cutouts 53 provided in the support plate 60. Following the axial rear movement of the handle 8, the valve member 10 continues to move back until the wire spring 45 is accepted in the forward recess 34, which will thus stop the axial motion. The valve is now immobilized in a second position, which is the open position, with the annular channel 12 or 12' in communication with the bore 38 or 39.

In fact, in this configuration, the annular channel 12 comes into coincidence with the vertical bored passage 38. The air flow can thus circulate and arrive in the separating notch 27, with the jet of pressurized air then exiting through the separating nozzle 77, as shown in FIG. 2. In an analogous way, the air circulation in the braking groove 20 penetrates into a vertical bore 39.

In its context of operation, as shown in FIG. 3, the platen press made of a fixed upper support beam 80 and a mobile lower support beam or platen 82 is clearly distinguishable. Before printing, the sheet of paper 95 is brought into position between the two supporting beams by being displaced according to the arrow F and, at the same time, the metallized belt 90 advances above the sheet 95 in the opposite direction or in the direction of the arrow F'. The solenoid valve controlling the air intake into the groove 20 is then momentarily opened. The blower arrangement 100 according to the invention positioned horizontally downstream from the platen and appreciably above the plane of the sheet then directs a flat jet of air by means of the braking nozzles 79 during the deceleration phase of the sheet 95 before it is immobilized under the platen. The flat geometry of this air jet effectively prevents deformation of the surface of the sheet.

After printing, and when the lower support beam 82 begins to descend, the solenoid valve controlling the air to the groove 22 is momentarily opened. Then, a jet of air is directed by the separating nozzles 77 of the blower arrangement 100 approximately at the tangent point T between the sheet 95 and metallized belt 90. The relative planar geometry of this jet and its incidence proves to be particularly effective for separating the belt 90 from the sheet 95.

Although various minor modifications may be suggested by those versed in the art, it should be understood that I wish to embody within the scope of the patent granted hereon all such modifications as reasonably and properly come within the scope of my contribution to the art.

I claim:

1. A blower arrangement for detaching a metallized belt from a sheet and for creating a braking force on the sheet in a platen press, which comprises an upper fixed supporting platen and a lower mobile supporting platen, between which platens the sheet is transported in order to receive a printing according to a given pattern from a metallized film coming from the metallized belt conducted between the sheet and one of the platens of the platen press, said arrangement comprising a bar arranged next to the exit of the press, said bar being provided with a series of nozzles with each nozzle being sealed by control means, each nozzle having the shape of a flattened parallelepiped to create a plane of jets coming from said nozzles being directed approximately horizontally between the metallized belt and the sheet, said control means for each nozzle being a valve member that is translationally mobile in an axial direction between an open position and a closed position to a duct for supplying pressurized air to the nozzle, said valve member having a communication passage aligned with the duct when in the open position, each valve member having a periphery with two spaced indexing recesses, and flexible biasing means for retaining the valve in one of the open and closed positions by moving into one of the two spaced indexing recesses.

2. A blower arrangement according to claim 1, wherein the translational motion of each valve member is manually controlled.

3. A blower arrangement for detaching a metallized belt from a sheet and for creating a braking force on the sheet in a platen press, which comprises an upper fixed supporting platen and a lower mobile supporting platen, between which platens the sheet is transported in order to receive a printing according to a given pattern from a metallized film coming from the metallized belt conducted between the sheet and one of the platens of the platen press, said arrangement comprising a bar arranged next to the exit of the press, said bar being provided with a series of nozzles with each nozzle being sealed by a control means, each nozzle having the shape of a flattened parallelepiped to create a plane of jets coming from said nozzles being directed approximately horizontally between the metallized belt and the sheet, each nozzle being formed by a base plate, a diffusion plate having rectangular notches and a distribution manifold having, above each notch, an air supply duct that opens into the notch and said control means for each nozzle being a valve member axially movable in a perpendicular translation in the distributing manifold to the air supply duct.

4. A blower arrangement according to claim 3, wherein pressurized air is brought to each of the air supply ducts of the distribution manifold by two grooves provided along a part of a length of a lower surface of a supply manifold disposed on top of the distribution manifold.

5. A blower arrangement according to claim 4, wherein each groove of the two grooves has a decreasing cross section, with the largest cross section of each groove being situated adjacent an origin of the groove.

* * * * *